Jan. 2, 1968   J. A. MAIN ET AL   3,361,483
ORNAMENTED WHEEL STRUCTURE
Filed Jan. 5, 1966   2 Sheets-Sheet 1
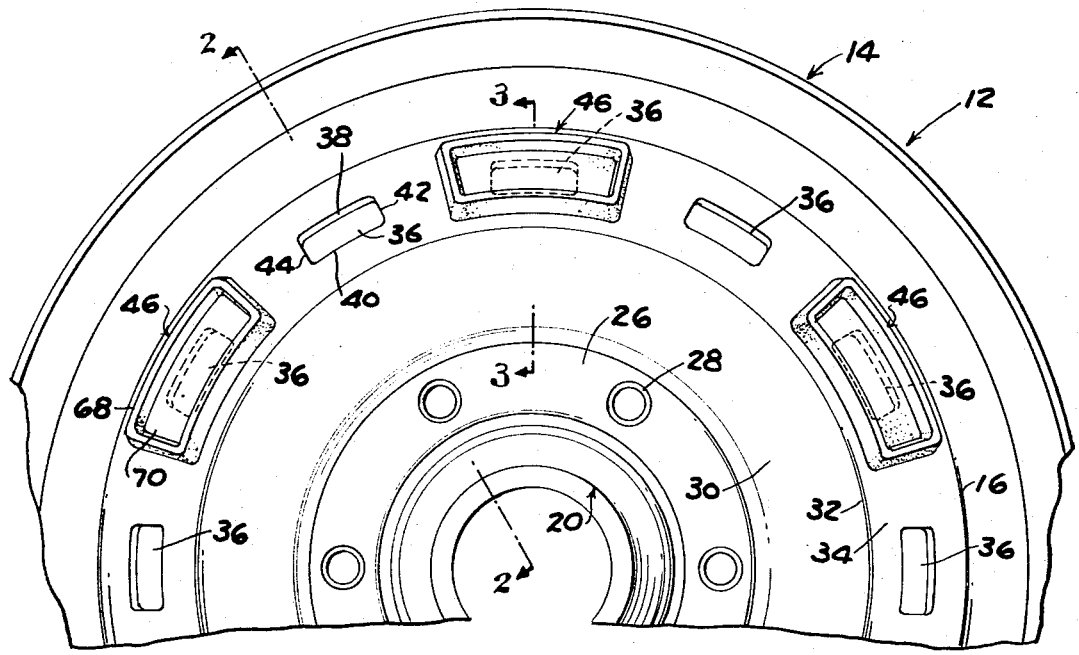
FIG. 1
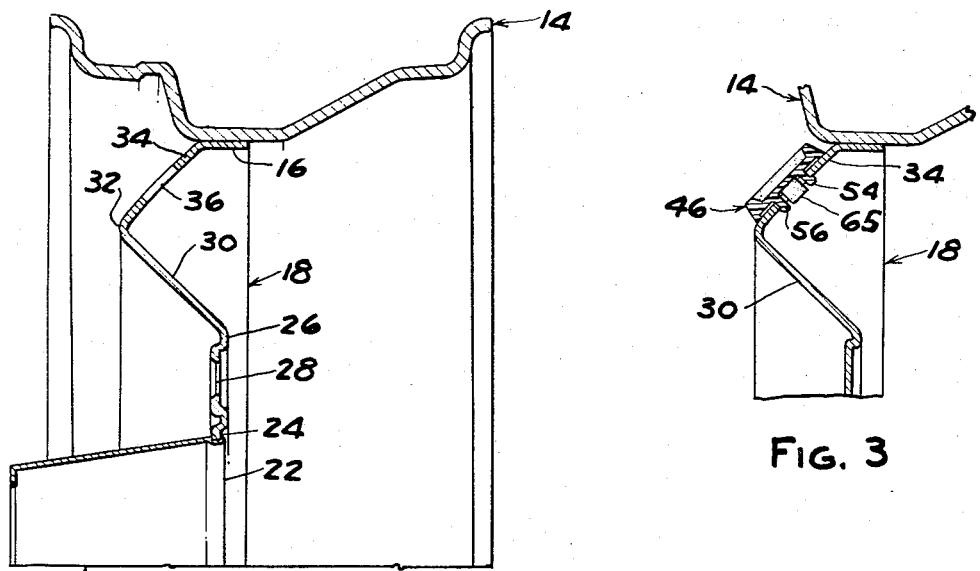
FIG. 2
FIG. 3
INVENTORS
JOHN A. MAIN, HENRY F. PAUL
AND DANN T. DEAVER
BY
Barnes, Kisselle, Raisch & Choate
ATTORNEYS

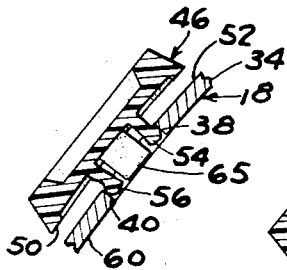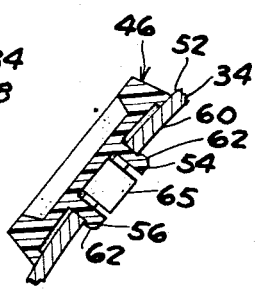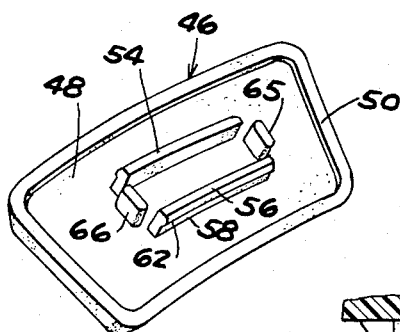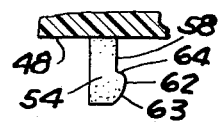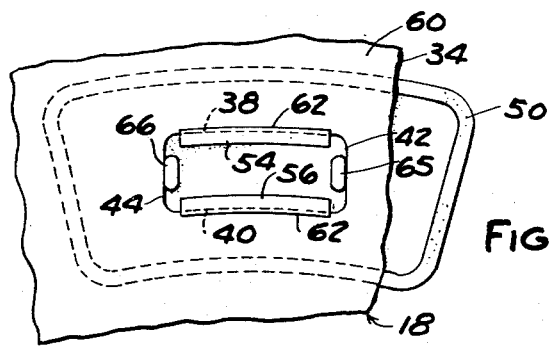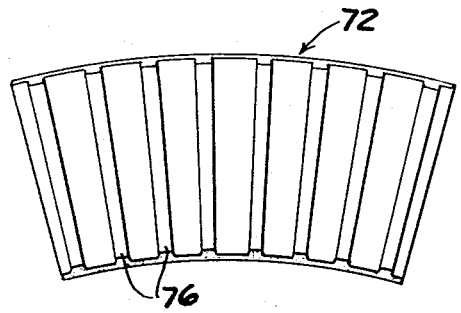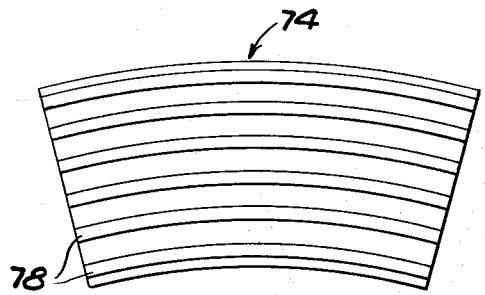

3,361,483
ORNAMENTED WHEEL STRUCTURE
John A. Main, East Lansing, Henry F. Paul, Okemos, and Dann T. Deaver, Mount Clemens, Mich., assignors to Motor Wheel Corporation, Lansing, Mich., a corporation of Ohio
Filed Jan. 5, 1966, Ser. No. 518,822
2 Claims. (Cl. 301—37)

ABSTRACT OF THE DISCLOSURE

A disc wheel having a circular row of spaced air vent holes alternately covered by a plurality of ornamental resilient inserts each mounted by reselient gripping fingers which are inserted through the associated hole as the insert is seated on the outboard face of the disc, the fingers each having a lip which snaps over the inner margin of the hole when the insert is yieldably depressed toward the disc after being seated thereon to thereby firmly retain the insert on the wheel.

---

This invention relates to motor vehicle wheels and more particularly to ornamental structure for the outer side of vehicle wheels of the disc type.

An object of the present invention is to provide a wheel the outer side of which presents a pleasing appearance when both at rest and in motion, and which is readily varied in appearance.

Another object is to provide an ornamented wheel of the above character having vents to permit cooling of the wheel and associated brake structure, and wherein the ornamentation comprises a plurality of inserts which are individually removably but securely mounted in a selected number of the air vents to impart a pleasing appearance to the wheel which may be varied merely by interchanging different styles of inserts.

A further object is to provide ornamental structure for a wheel of the above character which is inexpensive, corrosion and wear resistant, and which may be made in a variety of colors and configurations so that color as well as configuration may be incorporated into the appearance of the wheel without having to rely on a painted finish.

Other objects, features and advantages of the present invention will become apparent from the following detailed description taken in conjunction with the accompanying drawings wherein:

FIG. 1 is a fragmentary front elevational view of an ornamented wheel construction in accordance with the present invention.

FIG. 2 is a sectional view taken on the line 2—2 of FIG. 1.

FIG. 3 is a fragmentary sectional view taken on the line 3—3 of FIG. 1.

FIGS. 4 and 5 are enlarged fragmentary sectional views corresponding to the sectional view of FIG. 3 and respectively illustrating a plastic insert of the invention partially inserted into a vent hole in the disc (FIG. 4) and fully inserted and retained in place (FIG. 5).

FIG. 6 is a perspective view of one form of a plastic insert of the invention viewed from the rear side thereof.

FIG. 7 is a fragmentary enlarged sectional view of a portion of the insert of FIGS. 4–6 illustrating in end view one of the locking projections extending from the rear face of the insert.

FIG. 8 is a fragmentary elevational view illustrating an insert mounted on the disc of the wheel viewed from inside the wheel looking at the rear face of the insert and associated disc structure.

FIGS. 9 and 10 are elevational views of modified forms of the inserts illustrating how the outer side or face thereof may vary in configuration to impart a different ornamental appearance to the outer side of the wheel.

Referring in more detail to FIGS. 1–3, the ornamented wheel construction as shown herein by way of example may comprise an automotive type vehicle wheel 12 made up of the usual drop center steel rim 14 which is suitably joined as by spot or arc welding to the outer peripheral axial flange 16 of a steel disc or body 18 constructed in accordance with the present invention. Wheel 12 also has a generally frusto-conical shaped hub cap 20 suitably secured to the axle aperture of the disc, as by an externally grooved flange 22 of the cap which receives the inner margin 24 of disc 18. Disc 18 has a radially extending annular mounting portion 26 in which a plurality, e.g., six, of circumferentially spaced holes 28 are provided for receiving the usual headed mounting bolts for attaching the disc to the wheel hub (not shown). Radially outwardly of mounting portion 26, disc 18 flares outwardly in a smooth conical portion 30 to peak 32, and then flares inwardly again in another smooth conical portion 34 which terminates at flange 16. Disc 18 thus has a relatively simple contour, with mounting portion 26 rather deeply recessed into the outboard face of the wheel so that the heads of the wheel mounting bolts, although visible, are likewise recessed well into the outer face of the wheel. This configuration is preferred since it not only meets strength requirements but also presents an attractive appearance and thus eliminates the necessity for adding the usual ornamental wheel cover. However, it is to be understood that other configurations of disc 18 may be employed within the scope of the present invention and will become apparent subsequently herein.

In accordance with the present invention, a plurality of holes 36 are formed in disc 18 intermediate mounting portion 26 and flange 16, and preferably in the reentrant portion 34. Holes 36 are arranged in a circular row concentric with the wheel axis and equally spaced circumferentially around the disc. In the particular arrangement shown herein, holes 36 are generally rectangular in configuration as defined by opposite longitudinal edges 38 and 40 and opposite end edges 42 and 44 (FIG. 1). When made to the scale of the wheel shown in FIG. 1, holes 36 are preferably twelve in number, every other one being radially aligned with a bolt hole 28, and are of sufficient area so that six of the holes provide sufficient port area for passage of ventilating air currents axially through the disc to cool the wheel parts as well as the associated brake structure (not shown).

In accordance with a principal feature of the present invention, disc 18 as thus perforated by holes 36 cooperates structurally and ornamentally with a plurality of superimposed ornaments, preferably in the form of plastic inserts 46, which are individually mounted on the outboard face of the disc by snapping a hollow rearward projection of the insert into the particular vent hole 36 selected to receive the same. In the design shown herein, six identical inserts 46 are arranged one in every other hole 36 so that the inserts alternate with six empty vent holes 36 around the disc.

As best seen in FIGS. 4–8, inserts 46 each comprise a solid block of plastic material inexpensively injection molded from a thermoplastic resin, preferably an acrylonitrile-butadiene-styrene polymer, to any desired pleasing configuration and contour. Such material has high impact and wear resistance and hence is well adapted to withstand the dust, dirt and gravel scuffing typically encountered by automobile wheels. Such material also has sufficient heat resistance to withstand maximum normal wheel temperatures. Also, the inserts of this material may be made in a variety of colors by intermixing suitable pigments with the resins so that the color extends all the way through the insert. Each insert 46 on the rear or inboard side 48 thereof (FIG. 6) has a raised marginal rib 50 adapted to seat against the outer surface 52 of disc portion 34, the insert being made longer and wider than the associated hole 36 so that when the center of the insert is registered with the center of the hole, the insert completely covers and considerably overlaps the marginal area of the disc surrounding the hole.

Each insert 46 is detachably retained on disc 18 by a pair of resilient fingers 54 and 56 which project perpendicularly from face 48 and extend parallel to one another lengthwise of the insert for a distance somewhat less than the lengthwise dimension of the associated hole 36, as best seen in FIG. 8. Fingers 54 and 56 are shaped along their outer faces to have a flat portion 58 (FIG. 7) extending from face 48 and terminating flush with the inner surface 60 of disc 18 in the fully mounted position of the insert, as seen in FIG. 5. The remaining portion of the outer face of fingers 54 and 56 consists of a locking tab 62 (FIG. 7) adapted to overlap and grip surface 60 along edges 38 and 40 of the hole, as best seen in FIGS. 5 and 8. Tab 62 is tapered to have an increasing thickness from the outer end of the finger toward face 48 to thereby provide a camming surface 63 to facilitate mounting of the inserts on the disc.

As best seen in sequence in FIGS. 4 and 5, insert 46 is mounted on disc 18 from the outboard side by registering fingers 54 and 56 with hole 36 and parallel to edges 38 and 40 of the hole. The insert is then pushed toward face 52 of the disc, thereby forcing camming tabs 62 against edges 38 and 40 and, as the fingers are pushed into the hole, causing the fingers to yieldably flex toward one another (FIG. 4) until tabs 62 have passed completely through the hole (FIG. 5), whereupon the resiliency of the fingers snaps them apart into their original parallel relation so that lips 64 (FIG. 7) of tabs 62 overlap surface 60 of the disc and flats 58 are forced against edges 38 and 40. Preferably lips 64 are spaced from the plane of rib 50 such that rib 50 must first seat firmly on the outer surface 52 of the disc and then the center of the insert must be bowed slightly inwardly in order for tabs 62 to clear the hole and lips 64 to seat on surface 60. With this relationship, after pressure is released from the insert, its resiliency will thereafter exert a clamping force to maintain rib 50 and lips 64 firmly seated against the opposite surfaces 52 and 60 of the disc.

In addition to the snap-in locking fingers 54 and 56, insert 46 has a pair of spaced locating projections or stops 65 and 66 which also project from the rear face 48 thereof approximately the same distance as fingers 54 and 56. Stops 65 and 66 are located on the insert so as to extend through hole 36 respectively adjacent edges 42 and 44 thereof and serve to limit or prevent movement of the insert in a direction coincident with a line through the stops. The insert is prevented from shifting radially of the disc due to the tight fit of the fingers 54 and 56 with the edges 38 and 40 of the hole. Stops 64 and 66 are preferably made separate from fingers 54 and 56 and are spaced therefrom so as not to interfere with flexing the fingers when the same are pushed through disc hole 36 in mounting of the insert on the disc.

Mounting of inserts 46 is a simple and inexpensive procedure due to the snap-in action of the fingers 54 and 56. Although the insert will not become accidentally detached in use, and cannot be stolen from the outboard side of the wheel unless struck or pried loose with sufficient force to damage the same, it is readily removable from the inboard side of the wheel, preferably after the wheel has been removed from the vehicle, by squeezing fingers 54 and 56 together with a pliers while pushing outwardly on the insert through hole 36. The removal procedure is thus also relatively simple and quick, thereby facilitating replacement of damaged inserts or changing to a different set of inserts when it is desired to vary the ornamental appearance of the wheel.

From the foregoing description it will now be apparent that the present invention provides an improved ornamented wheel construction wherein snap-in plastic inserts cooperate with air vent openings in the disc of the wheel to provide an inexpensive system of adapting the same basic wheel construction or configuration to many different ornamental design variations merely by changing the style of the plastic insert, thereby permitting a wide variety of unique style adaptations at very low cost. As illustrated in the drawings the plastic inserts may vary widely in appearance. Insert 46 of FIGS. 1–8 is characterized by having on the outer side thereof exposed to view a raised peripheral rib 68 encircling a recessed face 70. The modified inserts 72 and 74 illustrated in FIGS. 9 and 10 respectively differ from insert 46 in having respectively a plurality of radially extending raised ribs 76 and a plurality of circumferentially extending raised ribs 78. The inserts may be molded from plastic in a variety of colors and styles to provide an inexpensive corrosion and wear resistant ornamentation from which the proper colors may be selected to harmonize or blend with the particular color scheme of any given vehicle without varying the basic wheel used. Thus color as well as configuration may be incorporated into the appearance of the wheel without having to rely on a painted finish. The inserts thus enhance the appearance of the wheel and also provide trouble free ornamentation at minimum cost and with a minimum of incentive toward theft. From the aesthetic standpoint, the ornamented wheel of the invention is attractive both when the vehicle is at rest and in motion, rotation of the wheel causing the inserts to generate to the eye of an observer a band of color as the inserts revolve with the wheel. This visual effect is accomplished, however, without preventing air circulation through the wheel disc which is needed to meet wheel and brake cooling requirements, a result which cannot be achieved by the ordinary wheel covers now widely in use which completely cover or mask the outboard side of the wheel in order to provide ornamentation for the same.

When inserts 46 are made of the aforementioned thermoplastic resin, they may, if desired, be permanently locked to the disc after the same have been inserted through opening 42 by applying sufficient heat to the normally resilient fingers 54 and 56 to cause them to lose their resiliency and become hardened and thus permanently set in their locked engagement with the wheel disc.

We claim:

1. A wheel comprising a tire-receiving rim, a disc secured to said rim and having a mounting portion adapted to be attached to a hub, said disc having a plurality of spaced air vent holes arranged in a circle concentric with said rim radially intermediate said rim and mounting portion, each of said holes having first and second generally parallel circumferentially extending edges spaced radially opposite from one another across said hole, and a plurality of ornamental inserts mounted on the outboard side of said disc in individual registry with at least some of said holes, each of said inserts being dimensioned to more than cover the associated hole and to bear against the outboard side of said disc, each of said inserts having first and second spaced resilient fingers extending through the associated hole respectively adjacent said first and second edges and each having a locking tab overlappingly engaging the inboard side of said disc to retain said insert on said disc, said tabs each having a tapering surface adapted for wedging engagement with said edges to develop a camming action for squeezing said fingers together, said locking tabs being spaced from one another such that upon insertion of said fingers into the associated hole said tapering surfaces engage said edges and are thereby squeezed toward one another to permit passage thereof through the associated hole, said fingers yieldably flexing to accommodate such movement of said tabs and, upon said tabs clearing said edges, springing said tabs apart into said overlapping retaining relationship with the inboard side of said disc, each of said inserts having a peripheral rib facing said disc seated on said outboard side of said disc outwardly of said hole margin, said insert having a face within the confines of said rib recessed relative to said rib and spaced from said outboard side of said disc, said locking tabs each further having a lip adapted to overlap and grip said inboard side of said disc when said rib is in firm contact with the outboard side of said disc, said lip being spaced from said recessed face a predetermined distance relative to the plane of said rib and the thickness of said disc at the margin of each hole such that said insert must be yieldably depressed toward said disc after seating of said rib in order to project said lip through said hole to said overlapping gripping position thereof.

2. The combination set forth in claim 1 wherein said holes are generally rectangular in configuration and are bounded by said first and second edges and by third and fourth oppositely disposed edges, and each of said inserts has a pair of locating projections spaced from one another and disposed one adjacent each of said third and fourth hole edges to limit movement of said insert circumferentially of said wheel, said locating projections also being disposed beyond and spaced from said fingers so as not to interfere with said flexing of said fingers.

References Cited
UNITED STATES PATENTS

| | | | |
|---|---|---|---|
| 2,248,707 | 7/1941 | Horn | 301—6 |
| 2,698,204 | 12/1954 | Poupitch | 301—63 |
| 2,754,939 | 7/1956 | Hibbard | 301—6 X |
| 2,984,382 | 5/1961 | Florsheim | 220—60 |
| 3,111,347 | 11/1963 | Miller | 301—108 |
| 3,256,044 | 6/1966 | Fisher | 301—63 |

RICHARD J. JOHNSON, *Primary Examiner.*